(12) United States Patent
Johansson et al.

(10) Patent No.: US 10,540,223 B1
(45) Date of Patent: Jan. 21, 2020

(54) SYSTEM FOR DETERMINING ERROR DATA

(71) Applicant: AMAZON TECHNOLOGIES, INC., Seattle, WA (US)

(72) Inventors: Jesper Mikael Johansson, Redmond, WA (US); Varadarajan Gopalakrishnan, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 278 days.

(21) Appl. No.: 15/050,197

(22) Filed: Feb. 22, 2016

(51) Int. Cl.
*G06F 11/00* (2006.01)
*G06F 11/07* (2006.01)
*G06F 3/0484* (2013.01)

(52) U.S. Cl.
CPC ........ *G06F 11/079* (2013.01); *G06F 3/04842* (2013.01); *G06F 11/0751* (2013.01); *G06F 11/0787* (2013.01); *G06F 11/0793* (2013.01)

(58) Field of Classification Search
CPC ............... G06F 11/079; G06F 11/0793; G06F 11/0751; G06F 11/0787; G06F 3/04842
USPC .......................................................... 714/57
See application file for complete search history.

(56) References Cited

U.S. PATENT DOCUMENTS

| | | | | |
|---|---|---|---|---|
| 10,305,758 B1* | 5/2019 | Bhide | ..................... | H04L 41/22 |
| 2007/0186002 A1* | 8/2007 | Campbell | .............. | H04N 7/142 |
| | | | | 709/231 |
| 2009/0310764 A1* | 12/2009 | Gerhart | ................... | G06Q 10/06 |
| | | | | 379/142.04 |
| 2010/0100412 A1* | 4/2010 | Cases | ...................... | G06Q 10/06 |
| | | | | 705/7.27 |
| 2011/0141913 A1* | 6/2011 | Clemens | ............. | H04L 41/0681 |
| | | | | 370/242 |
| 2012/0066547 A1* | 3/2012 | Gilbert | .................. | H04L 41/065 |
| | | | | 714/26 |
| 2012/0151279 A1* | 6/2012 | Armstrong | .......... | G06F 11/0793 |
| | | | | 714/48 |
| 2016/0203140 A1* | 7/2016 | Paul | ....................... | G06Q 10/06 |
| | | | | 707/723 |
| 2019/0123988 A1* | 4/2019 | Leverich | ............. | H04L 43/0823 |
| 2019/0171633 A1* | 6/2019 | Demla | ................ | G06F 16/2379 |

OTHER PUBLICATIONS

T"terminal" wikipedia page, retrieved from https://en.wikipedia.org/wiki/Terminal_(telecommunication) on Dec. 8, 2018 (Year: 2018).*

* cited by examiner

*Primary Examiner* — Yair Leibovich
(74) *Attorney, Agent, or Firm* — Lindauer Law, PLLC

(57) ABSTRACT

Described are techniques for determining occurrence of an error associated with a user device and user interfaces to present to users responsive to the error to acquire additional information. Particular user interfaces that correspond to an error may be determined based on the characteristics of the error. Particular communication channels by which the user interfaces may be provided to a user may be determined based on the devices affected by the error, the characteristics of the user interfaces, and the characteristics of the receiving devices. User input received responsive to a user interface may be associated with a particular error or user device and used to determine an action to be performed responsive to the error.

20 Claims, 7 Drawing Sheets

SYSTEM FOR DETERMINING ERROR DATA

BACKGROUND

When errors associated with computing devices occur, logs from these devices may be used, in combination with other information provided by users of the devices, to determine appropriate remedial actions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
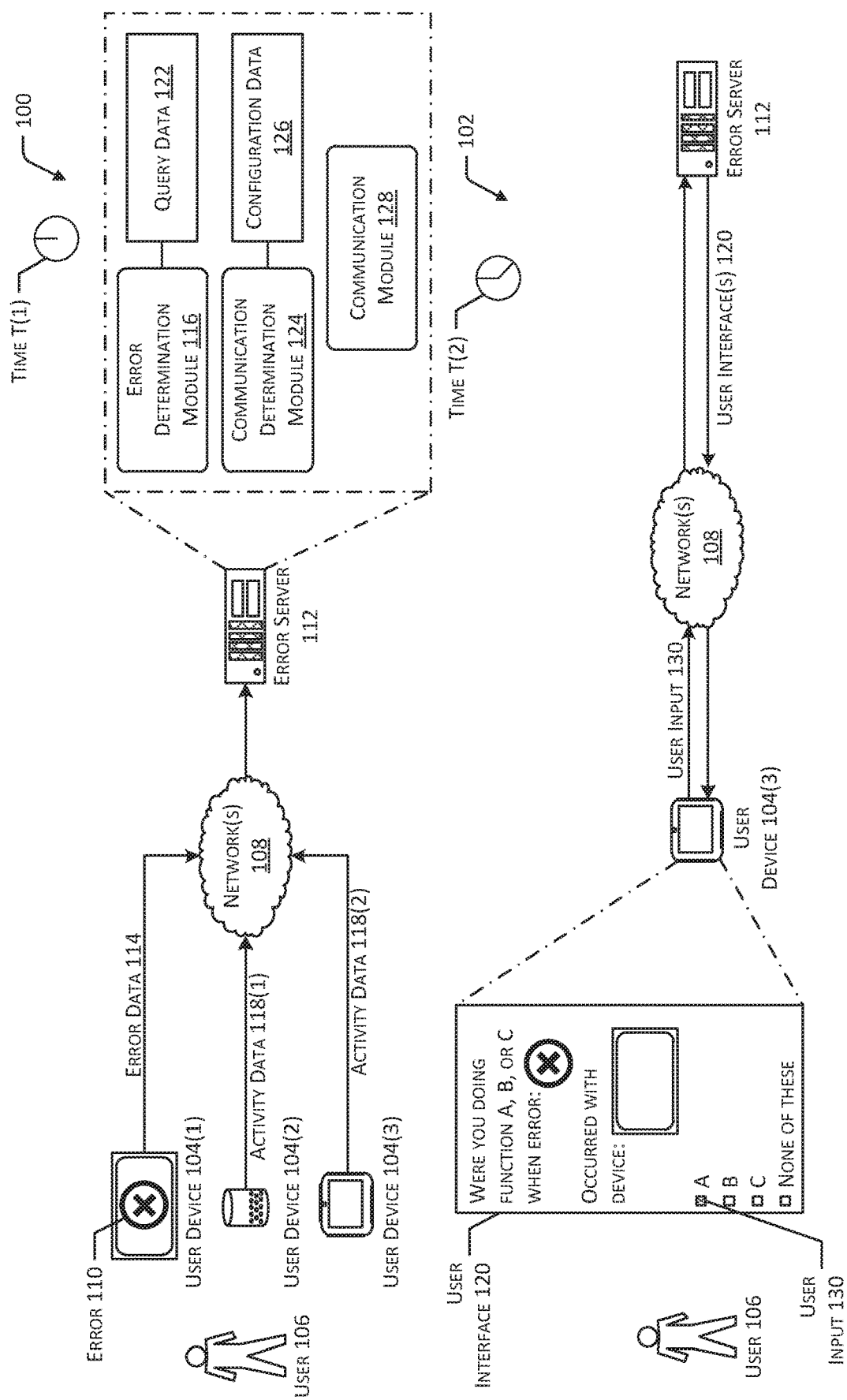
FIG. 1 depicts a system for determining user interfaces to provide to a destination device responsive to occurrence of an error associated with at least one user device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When an error occurs with regard to hardware or software associated with a computing device, a log associated with operations of the device at or proximate to the time of the error may be used to determine possible causes of the error. Analysis of the log may be used to determine possible remedial actions to correct the error, prevent future occurrences of the error, prevent similar errors, and so forth. In many cases, the information determined from an error log may be inconclusive or insufficient to determine an appropriate remedial action. In some cases, a user associated with the computing device may be asked to provide additional information describing the error. However, if the device experiencing the error is rendered non-functional by the error or if the device lacks suitable input or output devices to request or receive the additional information, it may not be possible to obtain such information from a user. Additionally, if a user is not prompted to provide information closely following the occurrence of the error, if the requested information is not specific to the error that occurred, or if the manner in which the information is requested and received is not user-friendly and readily associated with the error log, the information that is obtained may lack completeness or utility.

Described in this disclosure are techniques for at least partially automating the workflow involved in determining information regarding errors associated with computing devices. When an error associated with a first device occurs, the first device may generate error log data indicating the occurrence of the error and one or more characteristics of the error. The error log data may be obtained, such as by one or more servers or other computing devices, from the first device or from another computing device in communication therewith. The error log data may indicate a type or category corresponding to the error, particular hardware or software associated with the error, particular functions that were performed at or near the time of the error, and so forth. In some implementations, occurrence of an error may be determined by user input, such as a user reporting or otherwise indicating improper functionality of software or hardware, an improper display or other output, an inability to provide particular input, and so forth. In other implementations, when an error is determined, the first device may generate a signal indicative of the error at or near the time when the error occurs. In still other implementations, the first device may periodically generate a signal indicative of proper functioning of the first device, and the absence of the signal at a particular time may indicate occurrence of the error. In yet other implementations, a server or other device in communication with the first device may periodically provide a signal to the first device to determine proper functioning of the first device, and the result observed after providing the signal may indicate occurrence of the error.

In some implementations, the error log data may be determined from the first device automatically, such as within a threshold time of determination of the error. In other implementations, error log data may be determined periodically or continuously from the first device. Responsive to determination of the error or receipt of the error log data, a workflow process may be automatically initiated to determine additional information regarding the error. Configuration data associated with the first device may be used to determine one or more communication channels that may be used to obtain the additional information. For example, the configuration data may associate the first device (e.g., a device identifier associated therewith) with one or more corresponding communication channels, such as e-mail addresses, network addresses, and so forth that may be used to provide data to or receive data from the first device or other computing devices. In some implementations, communication channels may include channels for providing communications to an output device of the first device, such as a speaker, a display, and so forth. In other implementations, communication channels may include communications provided to one or more other computing devices associated with the first device or a user of the first device. For example, the first device may be rendered non-functional by the error, or the first device may be a headless device lacking suitable input or output devices for providing information to or receiving information from a user. In such cases, a communication channel may instead include an e-mail, text message, voice communication, or other type of user interface provided to a smartphone, tablet, computer, or other computing device in communication with the first device via a network or associated with a user of the first device. For example, the configuration data may include user account information indicative of one or more computing devices, communication means (e.g., e-mail addresses, telephone numbers, etc.), and so forth associated with one or more users of the first device.

Using the communication channel(s) determined from the configuration data, one or more user interfaces may be provided to the first device or other computing devices to request information associated with the error. In some implementations, the user interface(s) provided via the communication channel(s) may be selected or customized based on characteristics of the error. For example, at least a portion of the error log data may be analyzed to determine particular characteristics of the error, such as a type or category of the error, particular software or hardware associated with the error, particular functions performed by the first device at or near the time of the error, and so forth. In other implementations, one or more characteristics of the error may be determined from the error itself, the first device, other computing devices in communication with the first device, and so forth. For example, user input indicating the occurrence of the error may indicate a particular portion of input or output that is erroneous. As another example, one or more other computing devices in networked communication with the first device may provide activity data indicative of the status of the network or one or more of the networked computing devices at or near the time of the error.

In some implementations, correspondence between the error characteristics and query data associating error characteristics with user interfaces may be used to determine particular user interfaces that are relevant to a particular error. For example, user interface determined based on the characteristics of the error may include one or more questions soliciting additional information from a user, the questions being associated with the characteristics of the error. As another example, a user interface may include at least a portion of an output presented by the first device at or near the time of the error. Continuing the example, the user interface may include a portion of a display output previously provided by the first device at or near the time of the error, responsive to which a user may indicate or interact with a portion of the output. User interaction with the display output may be used to indicate a region of a display containing erroneous information, a region of a touchscreen that was contacted at the time the error occurred, and so forth.

Because the user interface(s) may be generated and provided responsive to receipt of error log data, close in time to the occurrence of the error, the user interface(s) and the user input received responsive thereto may be readily associated with one another. For example, the user interface(s) may include one or more identifiers associating the user interface(s) with the first device or the error log data. Based on one or more of the error log data or the user input received via the user interface(s), an action to be performed with regard to the error may be determined. Actions may include providing software or data to the first device, removing software or data from the first device, disabling one or more functions of the first device, providing notifications of the error or the cause of the error to one or more computing devices, and so forth.

In some cases, one or more of the error log data, the user input received responsive to a user interface, or other data determined from the first device or another computing device to which a user interface is provided may include private, confidential, or high-security information. In such cases, the user interface or a separate communication may include a request to access the private, confidential, or high-security information. Responsive to user input providing authorization to access the information, the error log data, user input, or other data associated with the error may be accessed and used to determine one or more possible actions to perform responsive to the error. In some implementations, the private, confidential, or high-security information may be modified, such as by removing identifying or sensitive data not relevant to the error, such as a user's name, contact information, financial information, and so forth. In other implementations, private, confidential, or high-security information may be accessed and transmitted using one or more security features, such as encryption or access controls. For example, the first device may lack security features, while a second computing device in communication with the first device is capable of encryption and authentication processes or is otherwise known to be a secure device, such as through use of trust or authentication techniques. One or more of the error data, the user interface(s), or the user input responsive to the user interface(s) may be provided to and received from the first device via the second computing device, which may encrypt the communications or use other security features to protect at least a portion of the communications.

Implementations within the scope of the present disclosure may thereby at least partially automate the workflow process for determining information associated with errors by providing one or more user interfaces to solicit information automatically, responsive to receipt of error log data indicating an error. The communication channels by which the user interfaces are provided may include the device affected by the error, other computing devices, or a combination, and the content of the user interfaces may be selected based on characteristics of the error.

FIG. 1 depicts a system for determining user interfaces to provide to a destination device responsive to occurrence of an error associated with at least one user device. The system is illustrated at different times, with the system at 100 shown at a first time T(1) determining occurrence of an error and the system at 102 shown at a second time T(2) providing a user interface to a computing device responsive to the error.

At 100, an environment is shown including a plurality of user devices 104 configured to provide content to a user 106. User devices 104 may include any manner of fixed, movable, or portable device configured to provide or receive any manner of input to or output from users 106. For example, input associated with a user device 104 may include visible input provided to a camera, audible input provided to a microphone, tactile input provided to a touch sensor or button, and so forth. Output associated with a user device 104 may include visible output provided to a display, audible output provided to a speaker, haptic output provided to a haptic device, olfactory output provided to an olfactory emitter, and so forth. In some cases, user devices 104 may include computing devices, such as mobile devices, set-top boxes, tablet computers, personal computers, wearable computers, servers, and so forth. User devices 104 may also include audio, video, olfactory, or haptic output devices, such as televisions or other display devices, speakers or other sound devices, and so forth. User devices 104 may further include devices adapted to receive input, such as signal transmitting devices used to communicate emergencies, scan or catalog items, indicate items to be purchased, and so forth. In some implementations, user devices 104 configured for one or more of audio, video, olfactory, or haptic input or output may include processors, memory, or other computing components. In other implementations, user devices 104 configured for such input or output may lack processing abilities but may communicate with other computing devices configured to send and receive signals to and from the user devices 104.

As such, a user device 104 may include any number or any type of input device, including, without limitation, one or more touch sensors, keyboards, mouse devices, microphones, image sensors (e.g., cameras), scanners, buttons, other types of sensors, and so forth. However, in some implementations, a user device 104 may entirely lack input devices. For example, a user device 104 may be controlled using signals received from a separate computing device. Similarly, a user device 104 may include any number or any type of output device, including, without limitation, one or more displays, speakers, haptic devices, printers, lights, other types of emitters, and so forth. In some implementations, a user device 104 may entirely lack output devices. For example, a user device 104 may be configured to receive input, such as a button press or voice command, which may then be provided to a separate computing device. Additionally, a user device 104 may include one or more processors, memories, modules, stored data, and so forth. However, in some implementations, a user device 104 may lack one or more of these components. For example, a user device 104 may be configured to receive or provide one or more of input or output while communicating with a separate computing device, which may be used to control the user device 104, receive and process input from the user device 104, and so forth.

In the example system shown in FIG. 1, a first user device 104(1) may include a television (e.g., a "smart TV") configured to provide audio and video content to users 106. A second user device 104(2) may include one or more speakers or other elements of a sound system that receive audio data from the first user device 104(1), or another computing device in communication therewith, to output audio content to users 106. A third user device 104(3) may include a computing device, such as a tablet computer, which may be configured to provide control signals to the other user devices 104, receive audio and video data from the other user devices 104, output the audio and video data to users 106, and so forth. The user devices 104 may communicate with one another using one or more networks 108, such as local area networks (LANs), wireless LANs, wide area networks (WANs), wireless WANs, and so forth. Various other computing devices may be associated with the network(s) 108, such as routers, access points, computers, other user devices 104, and so forth.

When an error 110 occurs with regard to one or more of the user devices 104, one or more error servers 112 may determine error data 114 indicative of one or more of the user devices 104 and the characteristics of the error 110. In some implementations, a user 106 may notice an error 110 associated with the content presented by the user device(s) 104 and provide input indicative of the error 110 to the error server(s) 112. For example, a portion of a display output provided by the first user device 104(1) may include a typographical error, a graphical irregularity, or the first user device 104(1) may otherwise be functioning improperly. Input provided by the user 106 using one or more of the user devices 104 or a separate computing device may indicate the error 110 and cause the error server(s) 112 to determine the error data 114 from the first user device 104(1). In other implementations, the first user device 104(1) may be configured to provide the error data 114 to the error server(s) 112 upon occurrence of the error 110. In still other implementations, the first user device 104(1), or another computing device in communication therewith, may be configured to provide a periodic or continuous signal to the error server(s) 112, or the error server(s) 112 may be configured to provide a periodic or continuous signal to the first user device 104(1) or other computing device associated therewith. If the result of providing or receiving the signal deviates from an expected result, such as an interruption or absence of an expected signal, this may indicate occurrence of the error 110, responsive to which the error server(s) 112 may determine the error data 114. In another implementation one or more other computing devices in communication with first user device 104(1), such as the second user device 104(2) or the third user device 104(3) may be configured to determine an error 110 with regard to other user devices 104 associated with the network(s) 108. Similarly, the first user device 104(1) may be configured to determine an error 110 with regard to other user devices 104. Subsequent to determination of an error 110, the user device 104 detecting the error 110 may provide the error data 114 or other data associated with the user devices 104 or the networks 108 to the error server(s) 112.

The error data 114 may include one or more device identifiers associated with the first user device 104(1) or other computing devices in communication therewith. The error data 114 may also include data indicative of characteristics of the first user device 104(1), other computing devices in communication therewith, the network(s) 108, and so forth. The error data 114 may further include data indicative of characteristics of the error 110, such as a type or category associated with the error 110, particular hardware or software affected by the error 110, particular functions of the first user device 104(1) that occurred at or proximate to the time of the error 110, the time that the error 110 occurred, and so forth. For example, the error data 114 may include an error log generated by a user device 104 or another computing device in communication with the user device 104. An error determination module 116 associated with the error server(s) 112 may process the error data 114 to determine the affected user device(s) 104 and the characteristics of the error 110. In some implementations, the error determination module 116 may also determine activity data 118 from other user devices 104 associated with or in communication with the user device 104(1) affected by the error 110. The activity data 118 may indicate one or more characteristics of the other user devices 104, the network(s) 108, or other computing devices in communication therewith. The activity data 118 may also indicate functions that were performed by the user device(s) 104 at or near the time of the error 110. In some implementations, the activity data 118 may include at least a portion of the error data 114. For example, the second user device 104(2) or the third user device 104(3) may be configured to determine occurrence of errors 110 with regard to the first user device 104(1) and provide information associated with the errors 110 to the error server 112. In other implementations, one or more of the user devices 104 or other computing devices in communication therewith may be configured to determine correspondence between the error data 114 or activity data 118 and an external data source containing information on errors. For example, the external data may include symptoms of particular errors associated with possible solutions to remedy the errors. If characteristics of the error 110 determined from the error data 114 correspond to the symptoms determined from the external data, the corresponding solution from the external data may be determined and output.

For example, the first user device 104(1), which may include a television, may experience an error 110 with regard to a display output. Based on an indication provided by a user 106, the first user device 104(1), another user device 104, or another computing device in communication with the first user device 104(1), the occurrence of the error 110 may be determined. In another implementation, occurrence of the error 110 may be determined by the error server(s) 112, such as by providing a periodic or continuous signal to the first user device 104(1) or one or more other computing devices in communication therewith. Responsive to determination that the error 110 has occurred, the error server(s) 112 may determine the error data 114 from the first user device 104(1). The first user device 104(1) may generate the error data 114 responsive to the error 110 or periodically or continuously during normal operation of the first user device 104(1). In other implementations, other computing devices in communication with the first user device 104(1), including, without limitation, the error server(s) 112 or the other user device(s) 104, may generate the error data 114. In some implementations, responsive to the determination that the error 110 has occurred, the error server(s) 112 may also determine activity data 118 from one or more other user devices 104. The activity data 118 may be generated by the user device(s) 104 responsive to the error 110 or periodically or continuously during normal operations. In some implementations, other computing devices in communication with the user device(s) 104, including, without limitation, the error server(s) 112, may generate the error data 114. For example, FIG. 1 depicts the second user device 104(2) providing first activity data 118(1) to the error server(s) 112 via the network(s) 108 and the third user device 104(3) providing second activity data 118(2) to the error server(s) 112 via the network(s) 108.

In some implementations, the error data 114 or activity data 118 may be provided directly from a user device 104 to the error server(s) 112 via the network(s) 108. In other implementations, the error data 114 or activity data 118 may be provided from one or more of the user devices 104 to one or more other computing devices associated with the network(s) 108. For example, the second user device 104(2) may include a speaker device that is not configured to transmit data to the error server(s) 112. The second user device 104(2) may provide the first activity data 118(1) to the third user device 104(3), which may include a tablet computer, and the third user device 104(3) may provide the first activity data 118(1) to the error server(s) 112. As another example, a router or another type of separate computing device associated with the network(s) 108 may receive the error data 114 or the activity data 118 from one or more of the user devices 104 and provide the error data 114 or activity data 118 to the error server(s) 112. In some implementations, the error data 114 or activity data 118 may include secure or private information. One or more user devices 104 may not be configured with security features, such as encryption, access controls, and so forth. Other user devices 104 or computing devices in communication therewith may include such security features. To protect the confidential nature of the error data 114 or activity data 118, this data may be provided from an unsecured user device 104 to another user device 104 or computing device having security features. The error data 114 or activity data 118 may then be provided to the error server(s) 112 in a secure manner.

Based on one or more of the error data 114 or the activity data 118, the error determination module 116 may determine one or more user interfaces 120 to provide to one or more of the user devices 104 or to one or more other computing devices. For example, the error determination module 116 may determine correspondence between error data 114 or activity data 118 and query data 122 associated with the error server(s) 112. The query data 122 may associate characteristics of errors 110 with one or more user interfaces 120. For example, the error data 114 may indicate that an error 110 is associated with particular type or category or with particular hardware or software. The query data 122 may include one or more particular user interfaces 120 associated with these error characteristics. Based on the query data 122, the error determination module 116 may determine one or more particular user interfaces 120 that correspond to the characteristics of the error 110 determined from one or more of the error data 114 or the activity data 118. In some implementations, the particular user interface(s) 120 may include questions regarding the error 110, the affected user device 104, functions or actions that were performed at or near the time of the error 110, the time of the error 110, the network(s) 108, or other devices associated with the user device 104 or the network(s) 108. In other implementations, the user interface(s) 120 may include at least a portion of an output provided by the affected user device 104. For example, a user interface 120 may include a screen capture representative of a portion of a display output that was presented by the first user device 104(1) at the time the error 110 occurred. The user interface 120 may request that the user 106 indicate the particular portion of the output that includes erroneous information or the portion of the output with which the user 106 interacted at the time that the error 110 occurred.

A communication determination module 124 associated with the error server(s) 112 may be used to determine a channel of communication by which the user interface(s) 120 may be provided to one or more users 106. In some implementations, a user interface 120 may be provided to the user device 104 associated with the error 110. For example, the user interface 120 may include questions regarding whether the receiving user device 104 has experienced an error 110, the particular hardware or software components affected by the error 110, and so forth. As another example, the user interface 120 may request an indication of a particular portion of output provided by the user device 104 that is associated with the error 110. In other implementations, the user interface 120 may be provided to one or more other user devices 104 or other computing devices associated with the user 106. For example, a user device 104 may be rendered non-functional or reduced in functionality due to the error 110. As another example, the user device 104 may lack output devices configured to provide the user interface 120 or input devices configured to receive responsive input to the user interface 120. As yet another example, a particular user device 104 may be unable to process or provide a particular user interface 120 due to the characteristics of the user interface 120. In such cases, the user interface 120 may be provided to a different user device 104 that is configured to output the user interface 120 and receive responsive input. Alternatively or additionally, the user interface 120 may be provided to a computing device separate from the user devices 104. For example, responsive to an error associated with the first user device 104(1), a user interface 120 may be provided, via e-mail, to a desktop computer associated with an owner of the first user device 104(1).

The communication determination module 124 may access configuration data 126 to determine one or more communication channels by which user interfaces 120 may be provided. The configuration data 126 may associate device identifiers of the user device 104 affected by the error 110 with particular communication channels. For example, a user 106 associated with a particular user device 104 may provide an e-mail address, telephone number, device or network identifier, or other data indicative of a computing device or manner in which a user interface 120 may be provided to the user 106 if an error 110 occurs. In some implementations, the particular communication channel by which a user interface 120 is provided may be determined based on the characteristics of one or more of the user devices 104, other computing devices, or of the user interface 120 itself. For example, if a particular user interface 120 includes features that may not be provided using e-mail, the user interface 120 may instead be provided using a different communication channel.

Communication channels may include particular user devices 104 or computing devices to which user interfaces 120 may be provided, as well as particular formats or media by which the user interfaces 120 may be transmitted, such as e-mail, Short Message Service (SMS), a hypertext markup language (HTML) or browser interface, other application interfaces, and so forth. For example, a user interface 120 that includes an audio output may be provided to the second user device 104(2), which may include one or more speakers. A user interface 120 that includes a visible output may be provided to one or more of the first user device 104(1) or the third user device 104(3), which may include one or more displays. A user interface 120 that includes alphanumeric output or requests alphanumeric input may be provided to the third user device 104(3) or to a separate computing device (e.g., via e-mail or SMS) having a display device and an input device configured to receive alphanumeric input.

A communication module 128 associated with the error server(s) 112 may provide the determined user interface(s) 120, via the determined communication channel(s), to one or more computing devices. For example, at 102, FIG. 1 depicts the error server(s) 112 providing a user interface 120 to the third user device 104(3), which includes a display configured to output the user interface 120 and a touch sensor configured to receive user input 130 responsive to the user interface 120. The depicted user interface 120 includes one or more questions associated with the error 110 affecting the first user device 104(1), such as the function(s) performed by the first user device 104(1) or other user devices 104 at the time when the error 110 occurred. In other implementations, user interfaces 120 may include other types and combinations of content including, without limitation, alphanumeric data, image data, audio data, data configured to cause haptic or olfactory output, and so forth. User interfaces 120 may be provided to any number or type of user devices 104. For example, while FIG. 1 depicts a single user interface 120 including a visible output provided to the third user device 104(3), other user interfaces 120, such as user interfaces 120 including audio output, could be provided to the second user device 104(2). Additionally, while FIG. 1 depicts a user interface 120 provided to one of the user devices 104, in other implementations, one or more user interfaces 120 may be provided to other computing devices, in communication with the user devices 104 or separate from the user devices 104.

The computing device that receives the user interface 120 may present the user interface 120 using an output device, such as one or more of a display or a speaker. Responsive to the user interface 120, one or more users 106 may provide user input 130 using an input device associated with the device presenting the user interface 120. For example, a user may select or provide a response to one or more questions presented in a user interface 120 using a keyboard, touch sensor, mouse device, and so forth. The user input 130 may be provided to or determined by the error server(s) 112 via the communication channel(s) determined by the communication determination module 124.

One or more of the user interface 120 or the user input 130 may be provided with data or metadata that associates the user interface 120 and user input 130 with the error data 114. For example, a device identifier or other communication information, such as an e-mail address, telephone number, or network address associated with a device receiving a user interface 120 may be stored in association with the error data 114. Subsequent user input 130 received responsive to the user interface 120 may then be determined to be relevant to the error 110. In some implementations, the user interface 120 may request information via a second communication channel that is associated with the error data 114. For example, responsive to error data 114 indicating an erroneous display device, a user interface 120 may be provided to a user 106 requesting that the user 106 acquire an image of the erroneous display (e.g., using a smartphone camera or similar image sensor) and provide the image via a particular communication channel (e.g., an e-mail address or as a SMS communication to a particular telephone number). Receipt of the image via the particular communication channel indicated in the user interface 120 may indicate that the received image is associated with the error 110.

Figure 2:
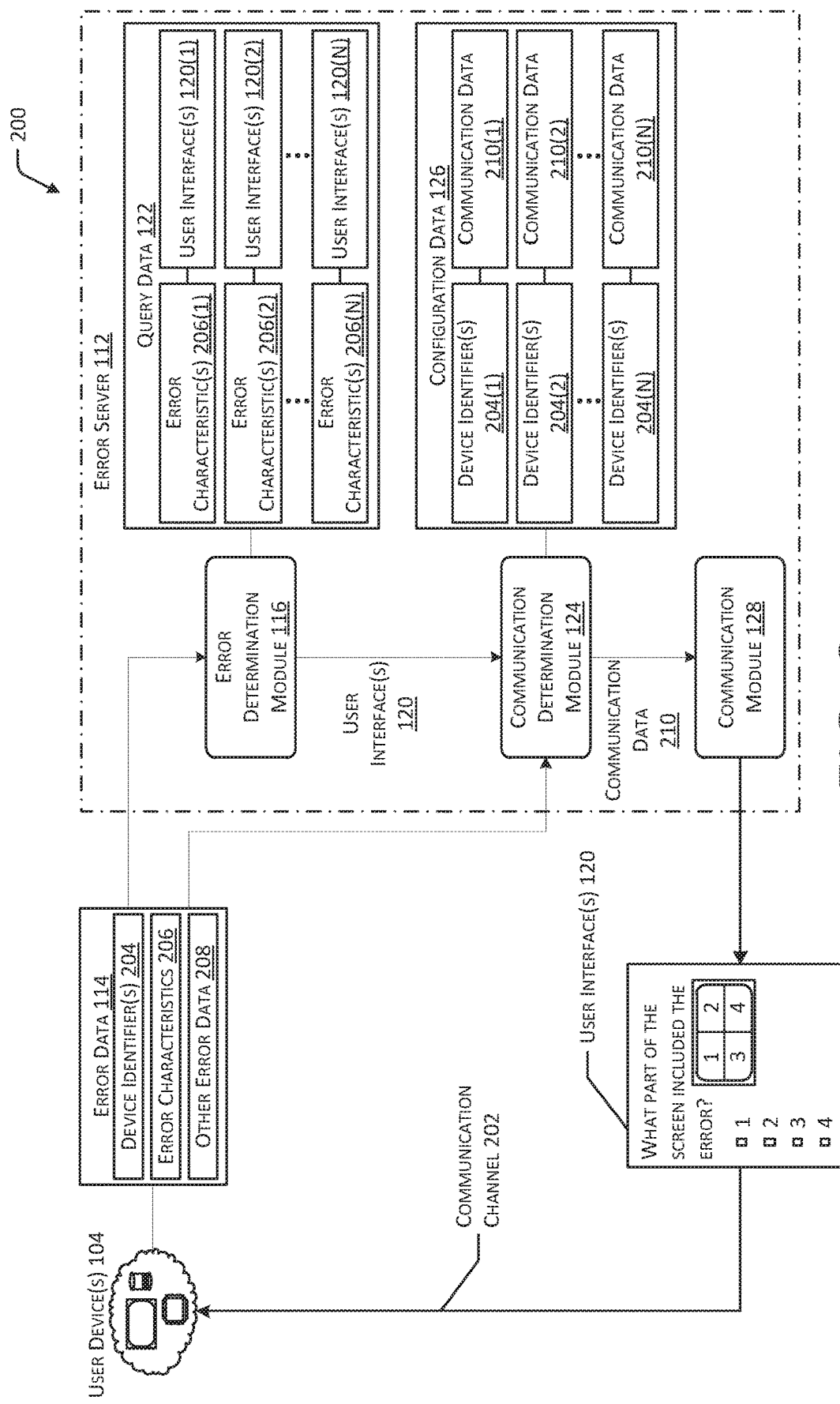
FIG. 2 depicts a system for determining communication channels to provide user interfaces to destination devices.

FIG. 2 depicts a system 200 for determining communication channels 202 to provide user interfaces 120 to destination devices (e.g., user devices 104 or other computing devices). As described with regard to FIG. 1, if an error 110 occurs with regard to one or more user devices 104, error data 114 associated with one or more of the error 110, the user device(s) 104, the network(s) 108 by which the user device(s) 104 communicate, and so forth may be determined by the error determination module 116. In some implementations, error data 114 associated with an error 110 affecting a particular user device 104 may be determined by other user devices 104 in communication with the affected user device 104. For example, multiple user devices 104 may be associated with a single user account, or identifiers associated with the user devices 104 may be mapped or stored in association with one another to indicate a relationship between the user devices 104. The error data 114 may include one or more device identifiers 204 indicative of the user device(s) 104 affected by the error 110 or other computing devices in communication therewith. Device identifiers 204 may include any manner of alphanumeric data, audio data, image data, or other types of data that may be used to differentiate a particular device from other devices. For example, a device identifier 204 may include a name associated with a user device 104, a user 106, or a user account, a network address such as an Internet Protocol (IP) or Media Access Control (MAC) address associated with a user device 104 or another computing device in communication with the user device 104, and so forth.

The error data 114 may also include data indicative of one or more error characteristics 206. Error characteristics 206 may include an indication of a type or category associated with an error 110, such as a code or other type of identifier. Error characteristics 206 may also include an indication of particular hardware or software components associated with the error 110, particular functions associated with the error 110, and so forth. Error characteristics 206 may further include an indication of a time at which an error 110 occurred. Other error data 208 may include characteristics of the user device 104 affected by the error 110, characteristics of other user devices 104 or computing devices in communication therewith, characteristics of the network(s) 108 associated with the user device, and so forth. For example, other error data 208 may indicate particular input or output devices associated with a user device 104 or other computing device in communication therewith. A user device 104 lacking one or more particular input or output devices may be unsuitable for providing certain user interfaces 120 or receiving user input 130 responsive thereto. In some implementations, the error data 114 may include a log generated by a user device 104 affected by an error 110 or another computing device in association therewith. The error determination module 116 may determine at least a portion of the error characteristics 206 by analyzing at least a portion of the log at or proximate to the time that the log is determined from the user device(s) 104.

As described with regard to FIG. 1, the error determination module 116 may determine one or more particular user interfaces 120 that correspond to the error 110 based on correspondence between at least a portion of the determined error characteristics 206 and query data 122. The query data 122 may associate one or more sets of error characteristics 206 with one or more sets of user interfaces 120. For example, FIG. 2 depicts the query data 122 including a first set of error characteristics 206(1) associated with one or more first user interfaces 120(1) and a second set of error characteristics 206(2) associated with one or more second user interfaces 120(2). The query data 122 may include any number of other error characteristics 206(N) associated with other user interfaces 120(N). While FIG. 2 depicts each set of error characteristics 206(1) associated with a single set of user interfaces 120(1), in other implementations, a set of error characteristics 206 may be associated with multiple sets of user interfaces 120, or multiple sets of error characteristics 206 may be associated with a single set of user interfaces 120. FIG. 2 depicts the error determination module 116 determining one or more particular user interfaces 120 based on the error characteristics 206 and the query data 122. For example, the error data 114 may indicate that an error 110 associated with a particular application has occurred. Based on this error characteristic 206, the error determination module 116 may determine that the query data 122 includes a corresponding user interface 120 that includes questions associated with the functions of the particular application.

The communication determination module 124 may determine one or more communication channels 202 by which the determined user interface(s) 120 may be provided to one or more users 106, based on correspondence between the device identifier(s) 204 of the error data 114 and configuration data 126. The configuration data 126 may associate particular device identifiers 204 with communication data 210 indicative of particular communication channels 202. For example, FIG. 2 depicts a first set of one or more device identifiers 204(1) associated with first communication data 210(1) and a second set of device identifiers 204(2) associated with second communication data 210(2). The configuration data 126 may include any number of other device identifiers 204(N) associated with any number of other communication data 210(N). Additionally, while FIG. 2 depicts each set of device identifiers 204 associated with a single set of communication data 210, in other implementations, a set of device identifiers 204 may be associated with multiple sets of communication data 210, or multiple sets of communication data 210 may be associated with a single set of device identifiers 204. The communication data 210 may include any manner of information that may be used to provide user interfaces 120 to computing devices via a communication channel 202 and to receive user input 130 responsive to the user interfaces 120. For example, the communication data 210 may include network addresses of computing devices, e-mail addresses associated with user accounts, telephone numbers associated with receipt of SMS messages, and so forth. FIG. 2 depicts the communication determination module 124 determining particular communication data 210 indicative of a communication channel 202 based on the device identifier(s) 204 of the error data 114. For example, configuration data 126 associated with a television may associate the device identifier 204 of the television with communication data 210 indicative of an e-mail address of a user 106 that owns the television. In some implementations, the configuration data 126 may also associate error characteristics 206, characteristics of computing devices, characteristics of the determined user interface(s) 120 and so forth with communication data 210 indicative of communication channels 202. For example, a particular user interface 120 may include features that may not be presented by a television or tablet computer. Based on this determination, the user interface 120 may instead be provided to a desktop computer using communication data 210 indicating a network address of the desktop computer. The communication module 128 may provide the user interface(s) 120 determined by the error determination module 116 to one or more receiving devices using the communication channel(s) 202 determined by the communication determination module 124. While FIG. 2 depicts a single communication channel 202, in other implementations, the communication determination module 124 may determine multiple communication channels 202, and different user interfaces 120 may be provided using different communication channels 202.

Figure 3:
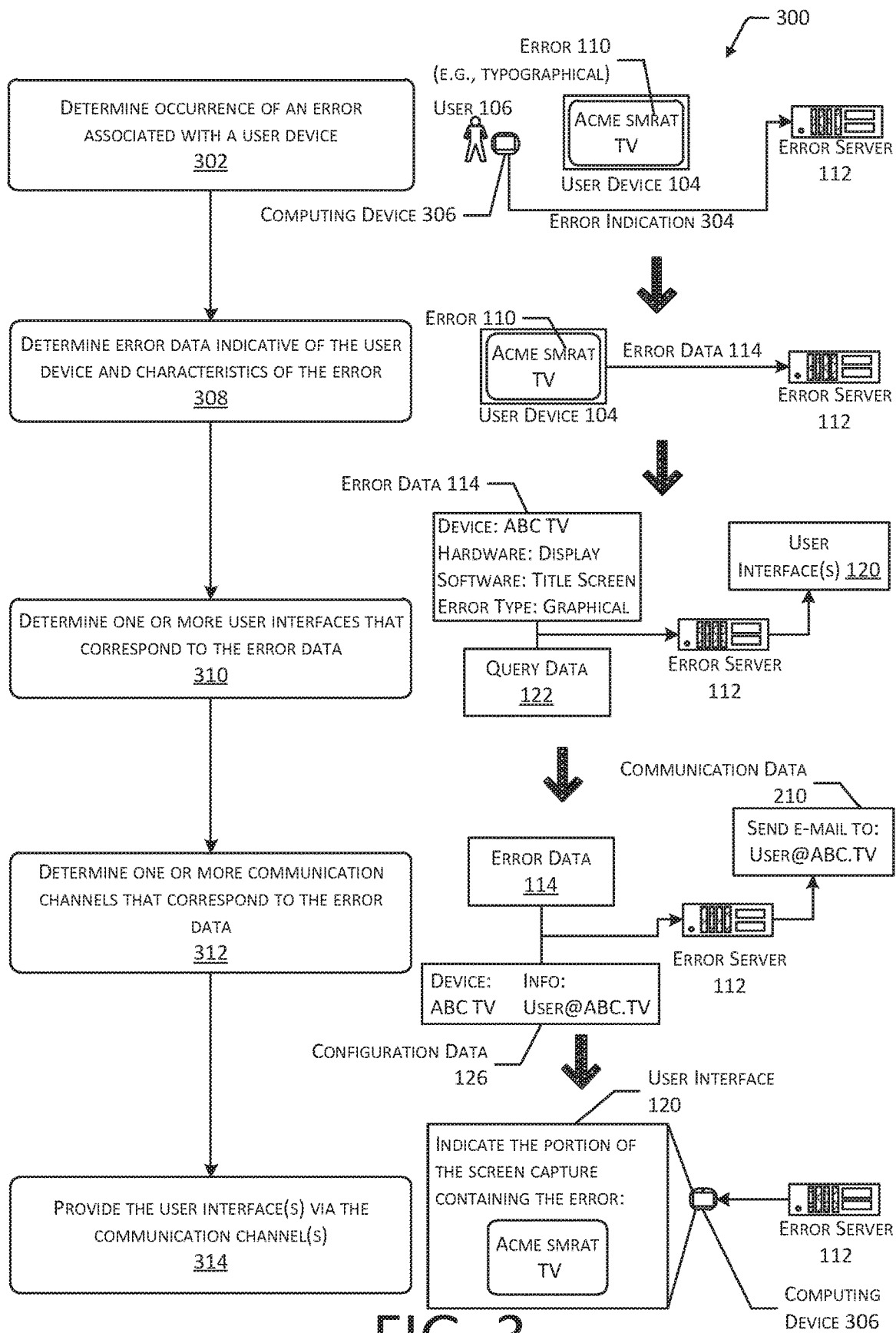
FIG. 3 depicts a scenario illustrating a method for determining and providing user interfaces responsive to the occurrence of an error associated with a user device.

FIG. 3 depicts a scenario 300 illustrating a method for determining and providing user interfaces 120 responsive to the occurrence of an error 110 associated with a user device 104. At 302, occurrence of the error 110 associated with the user device 104 may be determined by one or more error servers 112. For example, a user device 104 may include a smart television providing a display output that is viewed by a user 106. The user 106 may notice a graphical abnormality, such as a typographical error or an artifact, when executing a particular application using the user device 104. For example, a title screen for a user device 104 may erroneously include the text "SMRAT" when the text "SMART" was intended. The user 106 may provide an error indication 304 to the error server(s) 112, the error indication 304 indicating the presence of an error 110 associated with the current output presented by the user device 104. In some implementations, the user 106 may provide the error indication 304 using the user device 104. In other implementations, the user 106 may provide the error indication 304 using a separate computing device 306, such as a tablet computer accessible to the user 106 while viewing the content of the user device 104. In still other implementations, one or more of the user device 104 or the error server(s) 112 may determine occurrence of the error 110 in the absence of input from the user 106.

At 308, the error server(s) 112 may determine error data 114 indicative of the user device 104 and characteristics of the error 110. For example, the error data 114 may be requested by the error server(s) 112 or provided to the error server(s) 112 responsive to occurrence of the error 110. In some implementations, the error data 114 may include one or more logs generated by the user device 104, the computing device 306, or other computing devices 306 in communication therewith. As described with regard to FIG. 2, the error data 114 may include one or more device identifiers 204 indicative of the user device 104 or other computing devices 306 in communication therewith, and data indicative of error characteristics 206, such as a type or category of the error 110, hardware or software associated with the error 110, and so forth. In some implementations, the error data 114 may also include data indicative of characteristics of the user device 104, other computing devices 306 in communication therewith, networks 108 associated with the user device 104, and so forth. In other implementations, the error indication 304 provided by the user 106 or determined by the error server(s) 112 may indicate one or more error characteristics 206 or one or more devices affected by the error 110.

At 310, the error server(s) 112 may determine one or more user interfaces 120 that correspond to the error data 114. For example, FIG. 3 depicts the error data 114 including a device identifier 204 indicative of the user device 104 (e.g., "ABC TV"), an indication of particular hardware associated with the error 110 (e.g., "Display"), an indication of particular software executing at the time of the error 110 (e.g., "Title Screen"), and an indication of a type or category associated with the error 110 (e.g., "Graphical"). The error server(s) 112 may determine user interfaces 120 associated with the error 110 based on correspondence between the error characteristics 206 and query data 122. As described with regard to FIG. 2, the query data 122 may associate error characteristics 206 with particular user interfaces 120. For example, a particular user interface 120 may include questions, fields, images, or audio output specific to particular user devices 104, particular applications that were executing at or near the time of an error 110, particular hardware components affected by an error 110, and so forth.

At 312, the error server(s) 112 may determine one or more communication channels 202 that correspond to the error data 114. The communication channels 202 may be determined based on correspondence between the error data 114 and configuration data 126. As described with regard to FIG. 2, the configuration data 126 may associate particular device identifiers 204, error characteristics 206, characteristics of user interfaces 120, characteristics of networks 108, characteristics of other computing devices 306, and so forth with communication data 210 indicative of one or more communication channels 202. For example, FIG. 3 depicts the configuration data 126 including an e-mail address (e.g., "User@ABC.TV") that corresponds to the device identifier 204 (e.g., "ABC TV") for the user device 104. One or more user interfaces 120 may be provided to the computing device 306 or another device associated with the user 106 via the e-mail address. In some implementations, multiple communication channels 202 may be determined with regard to a particular error 110. For example, a first user interface 120 having audible elements may be provided using a first communication channel 202 (e.g., SMS) to a tablet computer having speakers. However, a second user interface 120 may include display elements incompatible with the display device of the tablet computer and may be provided via a different communication channel 202 (e.g., e-mail) to a desktop computer having a suitable display. A third user interface 120 may be provided to the user device 104 affected by the error 110, however, if the user device 104 has been rendered non-functional by the error 110, the third user interface 120 may instead be provided to a different computing device 306.

At 314, the determined user interface(s) 120 may be provided, via the communication channel(s) 202. For example, a particular user interface 120 may be provided to the computing device 306 associated with the user 106 via the determined e-mail address. The user interface 120 may include data or metadata that associates the user interface 120 or user input 130 received responsive to the user interface 120 with the error 110. In some implementations, the user interface 120 may include at least a portion of the output provided by the user device 104 at or near the time of the error 110. For example, FIG. 3 depicts the user interface 120 including a portion of the display output provided by the user device 104 at the time the error 110 was determined. The user interface 120 also includes a prompt, requesting the user 106 to indicate a particular portion of the output of the user device 104 that includes an error. For example, a user may provide user input 130 indicating a misspelled word (e.g., "SMRAT") presented in the display output using a touch sensor, keyboard, mouse device, and so forth.

Figure 4:
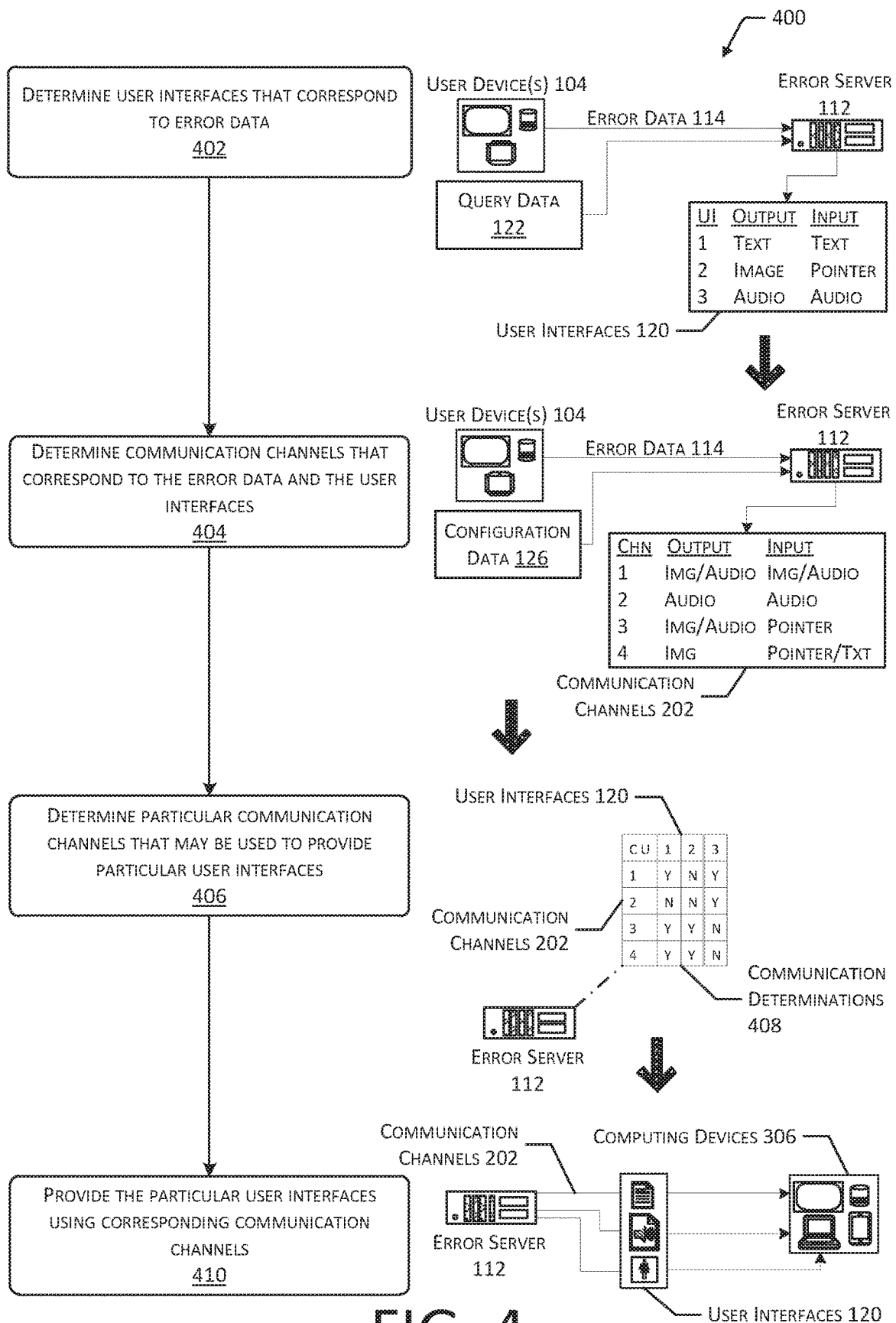
FIG. 4 depicts a scenario illustrating a method for determining communication channels for providing user interfaces to computing devices using the communication channels.

FIG. 4 depicts a scenario 400 illustrating a method for determining communication channels 202 for providing user interfaces 120 to computing devices 306 using the communication channels 202. At 402, one or more error servers 112 may determine user interfaces 120 that correspond to error data 114. As described with regard to FIGS. 1-3, when an error 110 associated with a user device 104 occurs, error data 114 may be determined from the user device 104 or other user devices 104 or computing devices 306 in communication therewith. The error data 114 may include device identifiers 204 indicative of the affected user device 104 and error characteristics 206 associated with the error 110. Error characteristics 206 may indicate a type or category of the error 110, particular hardware or software associated with the error 110, functions performed by the user device 104 or other devices at or near the time of the error 110, the time at which the error 110 occurred, and so forth. Based on correspondence between the error data 114 and query data 122, which may associate user interfaces 120 with various error characteristics 206, the error server(s) 112 may determine one or more particular user interfaces 120 that correspond to the error characteristics 206 determined from the error data 114. The determined user interfaces 120 may include various characteristics, such as a type of output presented by the user interface 120 and a type of user input 130 that the user interface is configured to receive. The characteristics of the user interfaces 120 may affect whether particular user devices 104 or computing devices 306 may be used to present the user interfaces 120 to a user 106 or receive user input 130 responsive to the user interfaces 120. For example, FIG. 4 depicts a first user interface 120 configured to present text-based output, such as questions regarding an error, and to receive text-based user input 130, such as responses to questions. A second user interface 120 may be configured to present image-based output, such as a screen capture or a depiction of a display output, and to receive pointer-based user input 130, such as selection of a particular portion of the output using a touch sensor or mouse device. A third user interface 120 may be configured to present audio-based output, such as verbal prompts or questions using a speaker, and receive audio-based user input 130, such as verbal responses to the prompts or questions using a microphone.

At 404, the error server(s) 112 may determine communication channels 202 that correspond to the error data 114 and the user interfaces 120. As described with regard to FIGS. 1-3, particular communication channels 202 may be determined based on correspondence between the error data 114 and configuration data 126 that associates device identifiers 204 with communication channels 202. For example, the error data 114 may include device identifiers 204 indicative of a user device 104 affected by the error 110 or one or more other computing devices 306 in communication therewith. The configuration data 126 may indicate communication channels 202, such as network addresses of devices, e-mail addresses, telephone numbers, and so forth that correspond to particular device identifiers 204. In some implementations, multiple communication channels 202 may correspond to a particular device identifier 204 or set of device identifiers 204. For example, certain user interfaces 120 may include characteristics that may be presented via a first communication channel 202 using a first computing device 306, however the first communication channel 202 may be unsuitable for presenting other user interfaces 120. FIG. 4 depicts four communication channels 202 that correspond to the error data 114, each communication channel 202 being configured to provide certain types of output and receive certain types of user input 130. For example, a first communication channel 202 may be configured to provide image and audio-based output and to receive image and audio-based user input 130. Continuing the example, the first communication channel 202 may include a network address associated with a smart television having a display and speakers for providing output and a camera and microphone for receiving user input 130. The second communication channel 202 may be configured to provide audio-based output and receive audio-based user input 103. For example, the second communication channel 202 may include a network address associated with an audio output device, such as a speaker system with a microphone, configured to output and receive audible sound. The third communication channel 202 may be configured to provide image and audio-based output and receive pointer-based (e.g., selection-based) user input 130. For example, the third communication channel 202 may include a network address or e-mail address associated with a tablet computer or similar computing device 306 having a display and speakers for providing output and a touch sensor for receiving user input 130. The fourth communication channel 202 may be configured to provide image-based output while receiving pointer and text-based user input 130. For example, the fourth communication channel 202 may include a network address or e-mail address associated with a desktop computer or similar computing device 306 having a display for providing output and a keyboard and mouse device for receiving user input 130.

At 406, the error server(s) 112 may determine particular communication channels 202 that may be used to provide particular user interfaces 120 to various devices. For example, the communication determination module 124, the communication module 128, or one or more other modules associated with the error server(s) 112 may generate communication determinations 408 based on the characteristics of the user interfaces 120 and those of the communication channels 202. The communication determinations 408 may indicate particular communication channels 202 that are capable of presenting particular user interfaces 120 and receiving user input 130 responsive thereto. For example, the first communication channel 202, being capable of accommodating both image and audio-based output and input, may be used to provide the first user interface 120, which includes text-based output and input. The first communication channel 202 may also be used to provide the third user interface 120, which includes audio-based output and input. The first communication channel 202 would be unsuitable for providing the second user interface 120 due to the inability of the first communication channel 202 to accept pointer-based user input 130. The second communication channel 202, being capable of accommodating audio-based output and input, may be used to provide the third user interface 120, which includes audio-based output and input. The second communication channel 202 would be unsuitable for use with the first and second user interfaces 120 due to the inability of the second communication channel 202 to accommodate visible output (e.g., text or image), text-based user input 130, or pointer-based user input 130. The third communication channel 202, being capable of image and audio-based output and pointer-based user input 130, may be used to provide the first and second user interfaces 120. The third communication channel 202 would be unsuitable for use with the third user interface 120 due to the inability of the third communication channel 202 to receive audio-based user input 130. The fourth communication channel 202, being capable of providing image-based output and receiving pointer and text-based user input 130, may be used to provide the first and second user interfaces 120. The fourth communication channel 202 would be unsuitable for use with the third user interface 120 due to the inability of the fourth communication channel 202 to provide or receive audio-based output or input.

At 410, the error server(s) 112 may provide particular user interfaces 120 to one or more computing devices 306 using the corresponding communication channels 202 based on the communication determinations 408. In some implementations, a combination of communication channels 202 may be used in conjunction with a particular user interface 120. For example, a first communication channel 202, such as a display device or a speaker system, may be used to provide output associated with a user interface 120, while a different communication channel, such as a keyboard or mouse device of a separate computing device 306, may be used to generate user input 130 responsive to the user interface 120.

Figure 5:
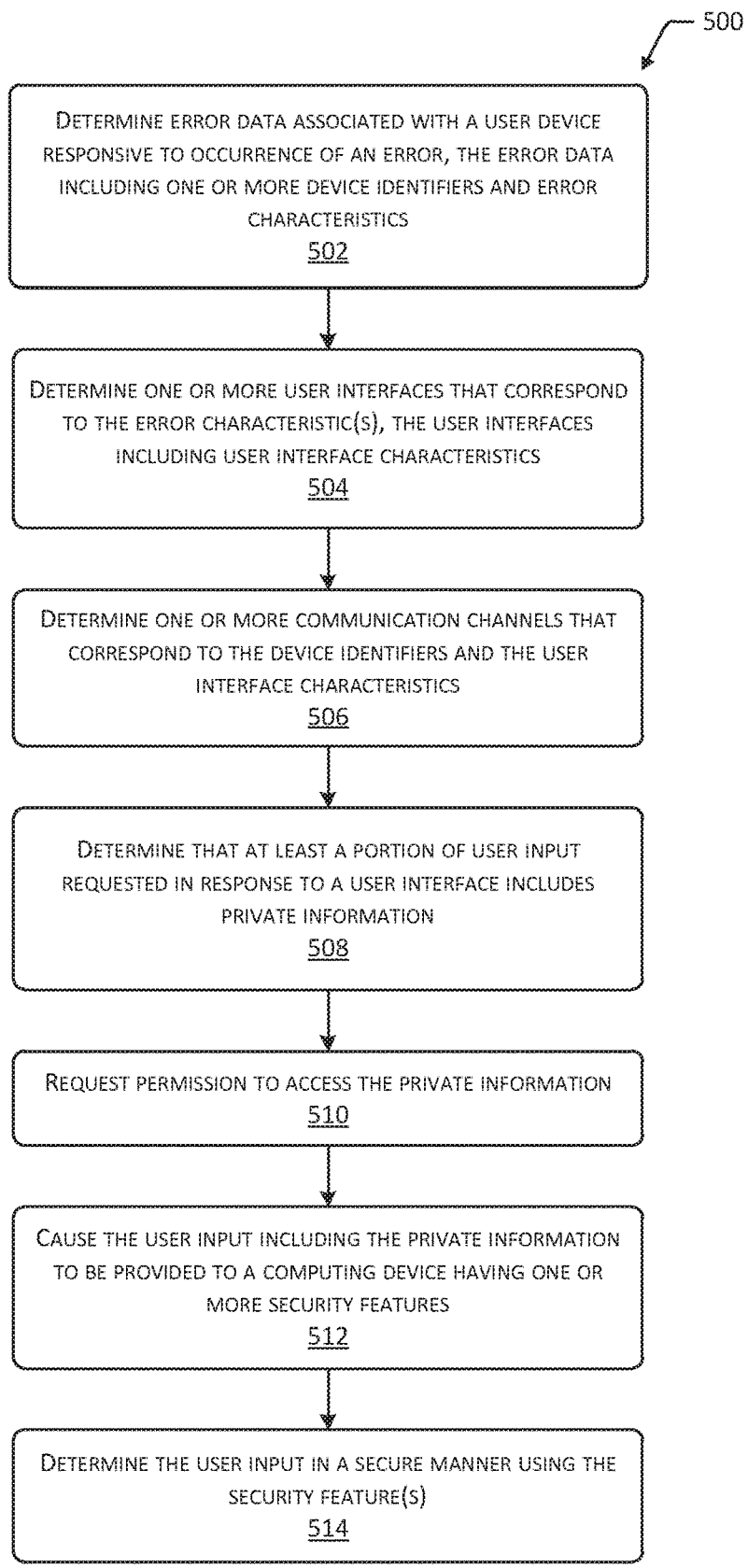
FIG. 5 is a flow diagram illustrating a method for providing user interfaces and receiving user input using one or more security features of a computing device.

FIG. 5 is a flow diagram 500 illustrating a method for providing user interfaces 120 and receiving user input 130 using one or more security features of a computing device 306. Block 502 determines error data 114 associated with a user device 104 responsive to occurrence of an error 110, the error data 114 including one or more device identifiers 204 and error characteristics 206. In some implementations, the error data 114 may be determined due to an error indication 304 provided by a user 106 or a process that determines an abnormality regarding a user device 104. In other implementations, the error data 114 may be determined by the user device 104 or another computing device 306 in communication therewith, which may cause the error data 114 to be provided to one or more error servers 112.

Block 504 determines one or more user interfaces 120 that correspond to the error characteristics 206, the user interfaces 120 including user interface characteristics. For example, as described with regard to FIG. 4 particular user interfaces 120 that correspond to certain errors 110 may be determined based on correspondence between the error characteristics 206 and query data 122 that associates error characteristics 206 with user interfaces 120. Each user interface 120 may be configured to provide certain types of output (e.g., alphanumeric data, audio data, image data, data configured to cause olfactory or haptic output, and so forth). Each user interface 120 may be configured to receive certain types of user input 130 including the same type of data as the output or one or more different types of data.

Block 506 determines one or more communication channels 202 that correspond to the device identifiers 204 and the user interface characteristics. Particular communication channels 202 that correspond to certain user devices 104 may be determined based on correspondence between the device identifiers 204 and configuration data 126 that associates device identifiers 204 with communication channels 202. In some implementations, the configuration data 126 associated with a particular device identifier 204 may be provided by one or more users 106. For example, a user 106 may select to receive user interfaces 120 via a particular e-mail address, via SMS, via a messenger service associated with a particular computing device 306, and so forth. In some implementations, a user 106 may rank, categorize, or provide a hierarchy associated with various communication channels 202. For example, a user 106 may indicate a preference that user interfaces 120 are to be provided to a particular e-mail address associated with a first computing device 306. However, if a user interface 120 includes characteristics that are not suitable for use with e-mail or the first computing device 306, the configuration data 126 may indicate that the user interface 120 may instead be provided to a different computing device 306. In some implementations, if configuration data 126 specific to a particular user device 104 does not exist, one or more default communication channels 202 may be used. In other implementations, if no communication channel 202 associated with user-provided configuration data 126 may be used with a particular user interface 120, a default communication channel 202 may instead be used.

Block 508 determines that at least a portion of user input 130 requested in response to a user interface 120 includes private information. For example, a user interface 120 may include a request to monitor input, output, or functions of a user device 104 for a period of time, during which a user 106 may provide or receive passwords, user account information, financial information, and so forth. As another example, an error 110 may occur when a user device 104 is used to transmit or modify user account data, complete a financial transaction, or manipulate other types of private information. The error data 114 associated with the error 110 or one or more characteristics of the corresponding user interface(s) 120 may indicate that at least a portion of the user input 130 received responsive to the user interface(s) 120 may include private information.

Block 510 requests permission to access the private information. For example, the user interface 120 or a separate communication may be provided via a communication channel 202 identifying private information and requesting permission to access it. Continuing the example, the user interface 120 or separate communication may request access to monitor input or output provided to a user device 104 over a period of time, to obtain screen captures associated with the user device 104, to access data that was provided to or received from the user device 104 at or near the time when the error 110 occurred, and so forth. In some implementations, authorization to access private information may be obtained prior to occurrence of an error 110, such as at the time a user device 104 is provided to a user 106 or at the time that a user account is generated.

Block 512 causes the user input 130, including the private information, to be provided to a computing device 306 having one or more security features. For example, an error 110 may occur with regard to a television, sound system, or other type of user device 104 that lacks security features. A user 106 may provide user input 130 to the user device 104 affected by the error 110 responsive to one or more user interfaces 120. If the user device 104 does not include one or more security features, such as encryption or access controls, that may be applied to the private information, the user input 130 may be provided to another computing device 306 in communication with the user device 104. For example, while a smart television or sound system may lack security features, a tablet computer, router, or other computing device 306 in communication therewith may be configured to encrypt communications with the error server(s) 112. The error server(s) 112 may then determine the user input 130 from the computing device 306 associated with the security features. Block 514 determines the user input 130 in a secure manner using the security features.

Figure 6:
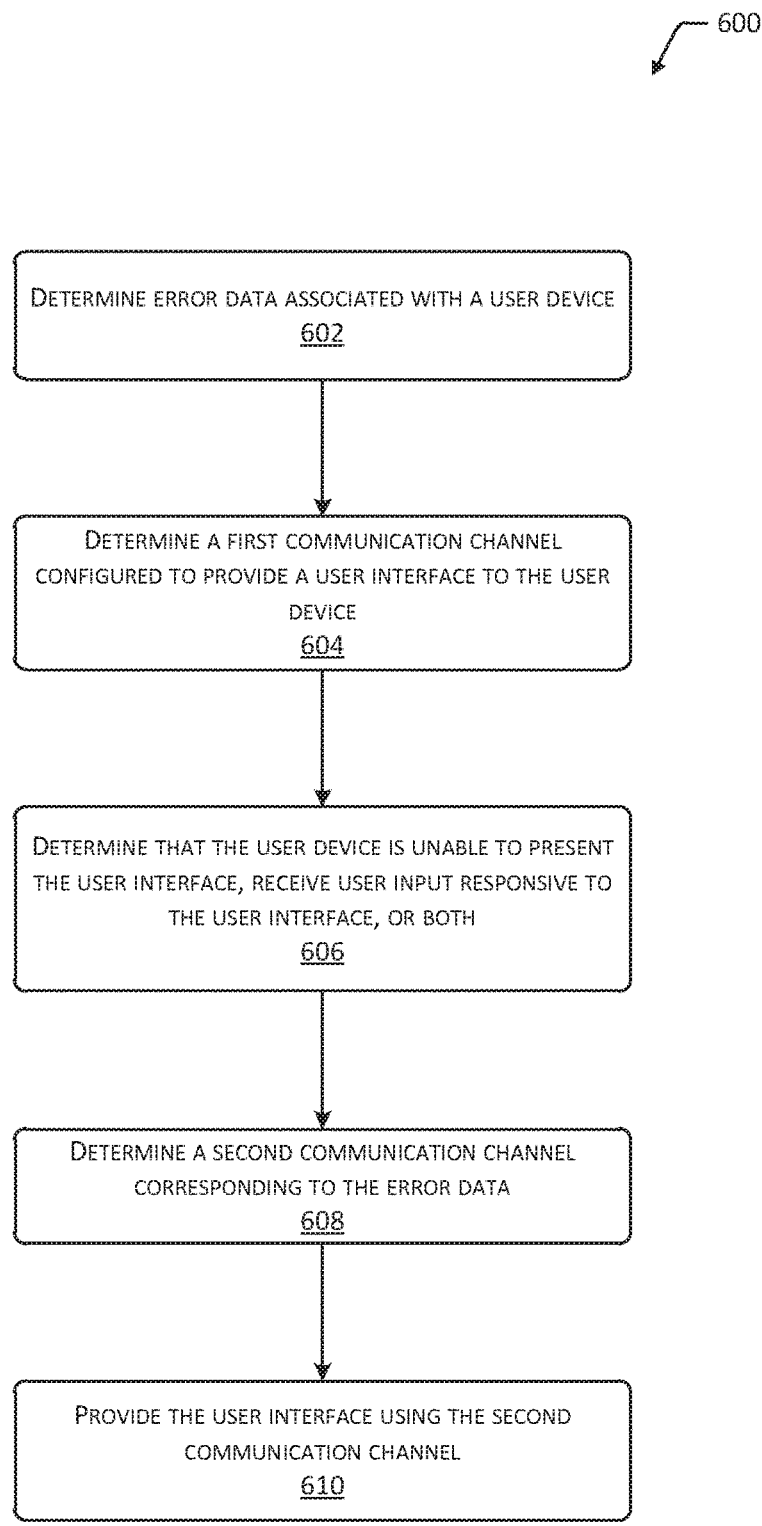
FIG. 6 is a flow diagram illustrating a method for determining alternate communication channels for use if a particular device is unable to present a user interface or receive user input.

FIG. 6 is a flow diagram 600 illustrating a method for determining alternate communication channels 202 for use if a particular device is unable to present a user interface 120 or receive user input 130. Block 602 determines error data 114 associated with a user device 104. When an error 110 occurs with regard to a user device 104, the user device 104, or another computing device 306 in communication therewith, may generate error data 114 that includes device identifiers 204 indicative of the user device 104 or other computing device 306 and error characteristics 206. The error data 114 may be determined by one or more error servers 112, such as by providing a request to the user device 104 or other computing device 306 to access or receive the error data 114. In other implementations, the error data 114 may be provided by the user device 104 or other computing device 306 at or near the time that the error 110 occurs. In still other implementations, the error data 114 may be provided to the error server(s) 112 based on input provided by a user 106 or other process.

Block 604 determines a first communication channel 202 configured to provide a user interface 120 to the user device 104. As described with regard to FIGS. 1 and 2, a communication determination module 124 associated with the error server(s) 112 may determine correspondence between the device identifier(s) 204 of the error data 114 and configuration data 126 that associates device identifiers 204 with communication channels 202. For example, the first communication channel 202 may include a network address or other communication data 210 that may be used to provide one or more user interfaces 120 to the user device 104 affected by the error 110.

However, in some cases, the user device 104 may be rendered unable to receive the user interface(s) 120 or user input 130 due to the error 110. In other cases, the user device 104 may lack input devices or output devices configured to receive user input 130 or present the user interface(s) 120. For example, a user interface 120 may include features, such as images or audio data, and the user device 104 may lack a display or speaker configured to present these features. Block 606 determines that the user device 104 is unable to present the user interface 120, receive user input 130 responsive to the user interface 120, or both.

Block 608 determines a second communication channel 202 corresponding to the error data 114. As described with regard to FIG. 5, configuration data 126 may include multiple communication channels 202 that correspond to a particular device identifier 204 or set of device identifiers 204. The multiple communication channels 202 may be ranked in order of preference. In some implementations, one or more default communication channels 202 may be used if the configuration data 126 does not include a communication channel 202 that may be used to provide a particular user interface 120 or receive user input 130 responsive thereto. For example, if a user device 104 is rendered non-functional by an error 110 and a first communication channel 202 associated with the user device 104 may not be used, a second communication channel 202 may include sending an e-mail to an e-mail address associated with a computing device 306 in communication with the user device 104. Block 610 provides the user interface 120 using the second communication channel 202. In some implementations, a user interface 120 may be provided using multiple communication channels 202. For example, a first portion of a user interface 120 may include visible components provided to a network address associated with a display device while a second portion of the user interface 120 includes audible components provided to a network address associated with a speaker.

Figure 7:
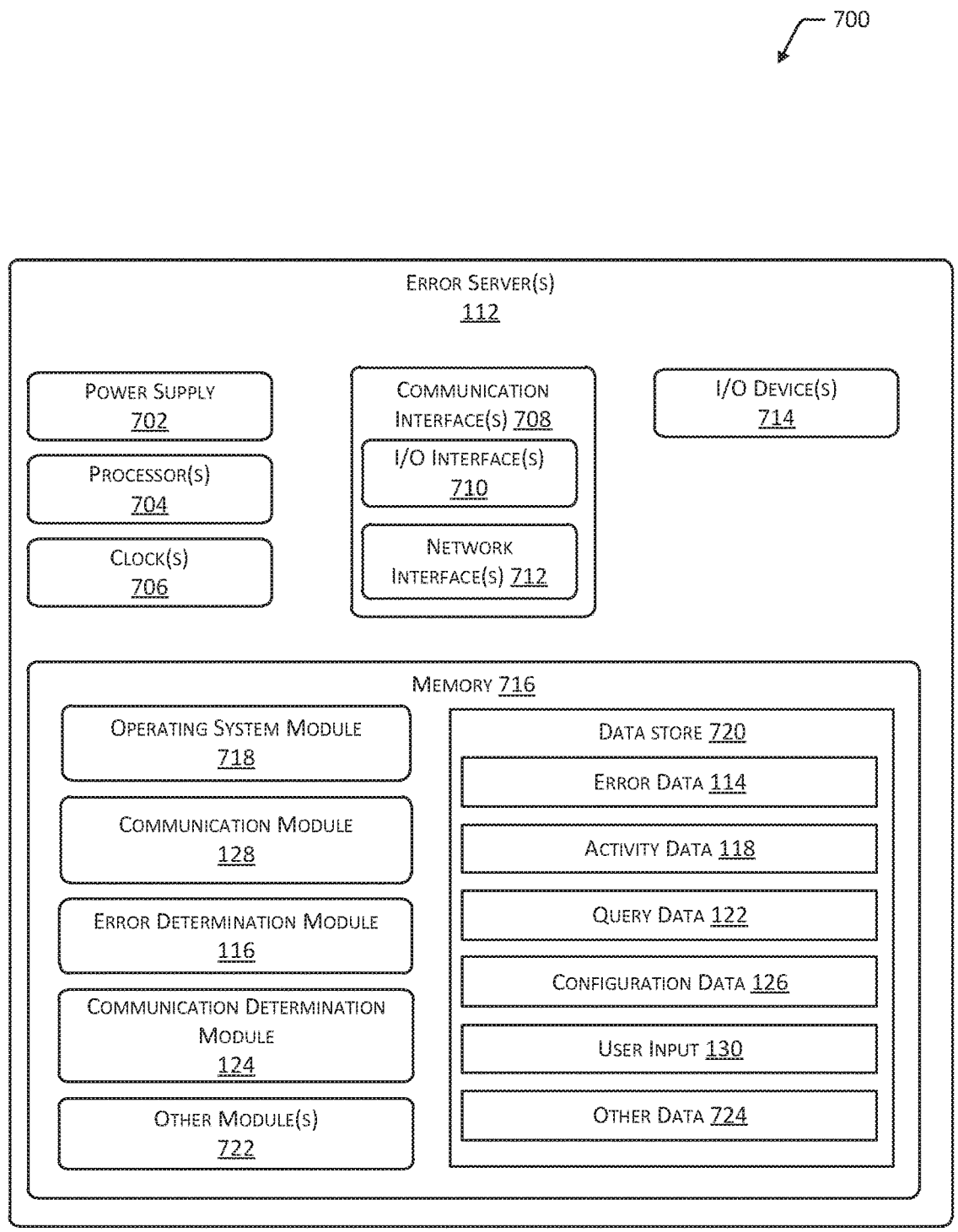
FIG. 7 is a block diagram depicting components of an error server within the scope of the present disclosure.

FIG. 7 is a block diagram 700 depicting components of an error server 112 within the scope of the present disclosure. While the error server 112 is depicted and described as one or more servers, in other implementations, the error server 112 may include any number and any type of computing device(s) 306. In some implementations, one or more of the functions described with regard to the error server(s) 112 may be performed by one or more user devices 104 or other computing devices 306.

One or more power supplies 702 may be configured to provide electrical power suitable for operating the components of the error server(s) 112. In some implementations, the power supply 702 may include a rechargeable battery, fuel cell, photovoltaic cell, power conditioning circuitry, and so forth.

The error server(s) 112 may include one or more hardware processor(s) 704 (processors) configured to execute one or more stored instructions. The processor(s) 704 may include one or more cores. One or more clocks 706 may provide information indicative of date, time, ticks, and so forth. For example, the processor(s) 704 may use data from the clock 706 to generate a timestamp, trigger a preprogrammed action, and so forth. In some implementations, data from the clock 706 may be used to determine times at which errors 110 occur with regard to user devices 104.

The error server(s) 112 may include one or more communication interfaces 708, such as input/output (I/O) interfaces 710, network interfaces 712, and so forth. The communication interfaces 708 may enable the error server(s) 112, or components of the error server(s) 112, to communicate with user devices 104, other computing devices 306, or components of the user devices 104 or other computing devices 306. The I/O interfaces 710 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include any manner of input device or output device associated with the error server(s) 112 or other computing devices 306 in communication therewith. For example, I/O devices 714 may include touch sensors, keyboards, mouse devices, microphones, image sensors (e.g., cameras), scanners, displays, speakers, haptic devices, printers, and so forth. In some implementations, the I/O devices 714 may be physically incorporated with the error server(s) 112 or other computing device 306 or may be externally placed.

The network interfaces 712 may be configured to provide communications between the error server(s) 112 and other devices, such as the I/O devices 714, routers, access points, and so forth. The network interfaces 712 may include devices configured to couple to one or more networks including LANs, wireless LANs, WANs, wireless WANs, and so forth. For example, the network interfaces 712 may include devices compatible with Ethernet, Wi-Fi, Bluetooth, ZigBee, Z-Wave, 3G, 4G, LTE, and so forth.

The error server(s) 112 may include one or more busses or other internal communications hardware or software that allows for the transfer of data between the various modules and components of the error server(s) 112.

As shown in FIG. 7, the error server(s) 112 may include one or more memories 716. The memory 716 may include one or more computer-readable storage media (CRSM). The CRSM may be any one or more of an electronic storage medium, a magnetic storage medium, an optical storage medium, a quantum storage medium, a mechanical computer storage medium, and so forth. The memory 716 may provide storage of computer-readable instructions, data structures, program modules, and other data for the operation of the error server(s) 112. A few example modules are shown stored in the memory 716, although the same functionality may alternatively be implemented in hardware, firmware, or as a system on a chip (SoC).

The memory 716 may include one or more operating system (OS) modules 718. The OS module 718 may be configured to manage hardware resource devices such as the I/O interfaces 710, the network interfaces 712, the I/O devices 714, and to provide various services to applications or modules executing on the processors 704. The OS module 718 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 720 and one or more of the following modules may also be stored in the memory 716. The modules may be executed as foreground applications, background tasks, daemons, and so forth. The data store 720 may use a flat file, database, linked list, tree, executable code, script, or other data structure to store information. In some implementations, the data store 720 or a portion of the data store 720 may be distributed across one or more other devices including other computing devices 306, network attached storage devices, and so forth.

The communication module 128 may be configured to establish communications with user devices 104, one or more other computing devices 306, and so forth. The communications may be authenticated, encrypted, and so forth.

The memory 716 may also store the error determination module 116. The error determination module 116 may determine error data 114 and activity data 118 from user devices 104 or other computing devices 306. The error determination module 116 may determine correspondence between one or more of the error data 114 or the activity data 118 and query data 122, to determine one or more user interfaces 120 that correspond to error characteristics 206 indicated by the error data 114.

The memory 716 may additionally store the communication determination module 124. The communication determination module 124 may determine correspondence between one or more of the error data 114, activity data 118, or user interface characteristics and configuration data 126 to determine particular communication channels 202 that may be used to provide user interfaces 120 and receive user input 130 responsive to the user interfaces 120. Communication channels 202 may include particular user devices 104 or computing devices 306 to which user interfaces 120 may be provided, as well as particular formats or media by which the user interfaces 120 may be transmitted, such as e-mail, Short Message Service (SMS), a hypertext markup language (HTML) or browser interface, other application interfaces, and so forth.

Other modules 722 may also be present in the memory 716. For example, encryption modules may be used to encrypt and decrypt communications between the error server(s) 112 and other computing devices 306. The other modules 722 may also include modules for logging interactions with user devices 104 and other computing devices 306. Other modules 722 may further include modules for machine learning. For example, if multiple errors 110 occur due a particular function of a particular application, when a subsequent error 110 occurs with regard to that application, the user interface 120 provided to a user 106 may include one or more questions to determine whether the particular function or application was used at the time that the error 110 occurred.

Other data 724 within the data store 720 may include user input data, such as configurations and settings associated with user devices 104, other computing devices 306, error server(s) 112, preferences regarding communication channels 202, and so forth. Other data 724 may also include security data, such as encryption keys and schema, access credentials, and so forth.

In different implementations, different computing devices 306 may have different capabilities or capacities. For example, error servers 112 may have significantly more processor 704 capability and memory 716 capacity compared to the processor 704 capability and memory 716 capacity of user devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
determine error log data associated with a first device having a device identifier, the error log data indicating an occurrence of an error having an error type;
responsive to the error log data, access configuration data associating the device identifier with at least one communication channel of one or more of the first device or a second device, wherein the at least one communication channel is usable to receive user interfaces for output using the one or more of the first device or the second device;
determine correspondence between the error type and query data associating error types with user interfaces;
based on the correspondence, determine one or more particular user interfaces configured to receive information indicative of functions that were performed when the error occurred;
based at least in part on the configuration data, provide the one or more particular user interfaces to the one or more of the first device or the second device via the at least one communication channel;
receive user input responsive to the one or more particular user interfaces;
determine an action to be performed based at least in part on the error log data and the user input; and
perform the action.

2. The system of claim 1, further comprising computer-executable instructions to:
    determine that the first device lacks one or more of:
        at least one output device configured to output the one or more particular user interfaces, or
        at least one input device configured to receive the user input; and
    based at least in part on the determination that the first device lacks the one or more of the at least one output device or the at least one input device, determine the at least one communication channel to be associated with the second device and provide the one or more particular user interfaces to the second device.

3. The system of claim 1, further comprising computer-executable instructions to:
    determine a display output associated with the first device that occurred within a threshold time of the occurrence of the error;
    wherein the one or more particular user interfaces include the display output; and
    wherein at least a portion of the user input includes an indication of at least a portion of the display output.

4. The system of claim 1, further comprising computer-executable instructions to:
    periodically receive a signal from the first device indicating functionality of the first device;
    determine a lack of the signal from the first device, the lack of the signal indicating a lack of functionality of the first device; and
    based at least in part on the lack of functionality of the first device, determine the at least one communication channel to be associated with the second device.

5. A method comprising:
    determining error data indicating an error associated with a first device and one or more characteristics of the error that indicate one or more of:
        a type or category of the error,
        software or hardware associated with the error, or
        one or more functions performed by the first device when the error occurred;
    in response to the error data, determining a communication channel based on configuration data associated with the first device, the configuration data indicating one or more of the first device or a second device, wherein the communication channel is configured to receive at least one user interface for output using the one or more of the first device or the second device;
    determining correspondence between the one or more characteristics of the error and query data that associates characteristics of the error with user interfaces;
    based on the correspondence between the one or more characteristics of the error and the query data, determining one or more particular user interfaces configured to receive information associated with the error;
    providing at least one of the one or more particular user interfaces to the one or more of the first device or the second device using the communication channel;
    receiving user input using the at least one of the one or more particular user interfaces; and
    performing an action based at least in part on the user input.

6. The method of claim 5, wherein determining the error data includes one or more of:
    receiving user input indicative of the error associated with the first device,
    receiving a signal associated with the first device, the signal indicating the error associated with the first device, or
    determining a lack of the signal associated with the first device, the lack of the signal indicating the error associated with the first device; and
    wherein the one or more of the user input indicative of the error, the signal, or the lack of the signal indicates a lack of functionality of the first device, and based at least in part on the lack of functionality, the communication channel is determined to be associated with the second device.

7. The method of claim 5, further comprising:
    determining the first device to be unable to receive the user input due to one or more of:
        a lack of functionality associated with the error, or
        a lack of an input device to receive the user input;
    determining the second device to be configured to receive the user input; and
    wherein the communication channel is associated with the second device, the at least one user interface is provided to the second device, and the user input is received from the second device.

8. The method of claim 5, further comprising:
    determining the first device to be unable to output the at least one user interface due to one or more of:
        a lack of functionality associated with the error, or
        a lack of an output device to output the at least one user interface;
    determining the second device to be configured to output the at least one user interface; and
    wherein the communication channel is associated with the second device and the at least one user interface is provided to the second device.

9. The method of claim 5, further comprising:
    determining an output of the first device associated with the error data; and
    wherein the at least one user interface includes at least a portion of the output, and at least a portion of the user input includes one or more of an indication of or an interaction with the at least a portion of the output.

10. The method of claim 5, further comprising:
    responsive to determination of the error data, monitoring one or more of input or output associated with the first device; and
    wherein at least a portion of the user input includes the one or more of the input or the output associated with the first device.

11. The method of claim 5, further comprising:
    determining that at least a portion of one or more of the error data or the user input includes private data;
    providing a request to access the private data to the one or more of the first device or the second device;
    receiving a response associated with the request; and
    performing a security action associated with the private data.

12. The method of claim 5, wherein the second device is in communication with the first device and determining the error data includes:
    receiving the error data from the second device, the error data indicating the one or more characteristics of the error or one or more characteristics of the first device.

13. The method of claim 5, further comprising:
    determining a third device in communication with the one or more of the first device or the second device, the third device having one or more associated security features; and wherein one or more of the error data or the user input is provided from the one or more of the first device or the second device to the third device and received from the third device.

14. The method of claim 5, further comprising:
determining a time associated with the error data;
determining one or more third devices in communication with the first device; and
determining activity data associated with the one or more third devices, wherein the activity data indicates activity of the one or more third devices within a threshold time of the time associated with the error data, and wherein the action is determined based at least in part on the activity data.

15. A system comprising:
one or more memories storing computer-executable instructions; and
one or more hardware processors configured to execute the computer-executable instructions to:
   determine error data indicative of an error associated with a first device;
   determine query data that associates one or more characteristics of the error with one or more user interfaces;
   determine correspondence between at least a portion of the error data and the query data;
   based on the correspondence, determine one or more particular user interfaces that are configured to receive information associated with the error;
   determine an inability of the first device to one or more of: output the one or more particular user interfaces or receive user input associated with the one or more particular user interfaces;
   determine, based on configuration data associated with the first device, a communication channel associated with a second device configured to output the one or more particular user interfaces and receive the user input associated with the one or more particular user interfaces;
   provide the one or more particular user interfaces to the second device via the communication channel;
   receive the user input associated with the one or more particular user interfaces; and
   perform an action based at least in part on one or more of the error data or the user input.

16. The system of claim 15, further comprising computer-executable instructions to one or more of:
   receive user input indicative of the error associated with the first device,
   receive a signal associated with the first device, the signal indicating the error associated with the first device, or
   determine a lack of the signal associated with the first device, the lack of the signal indicating the error associated with the first device; and
   wherein the one or more of the user input indicative of the error, the signal, or the lack of the signal indicates the inability of the first device.

17. The system of claim 15, wherein the first device lacks one or more of:
   an input device configured to receive the user input, or
   an output device configured to output at least one query; and
   the second device includes the one or more of: the input device configured to receive the user input or the output device configured to output the at least one query.

18. The system of claim 15, further comprising computer-executable instructions to:
   receive, from one or more of the first device or the second device, an indication of one or more of a type or a device, associated with the error data; and
   wherein the one or more particular user interfaces are further determined based at least in part on the indication.

19. The system of claim 15, further comprising computer-executable instructions to:
   determine at least a portion of one or more of the error data or the user input to include private data;
   provide a request to access the private data to one or more of the first device or the second device;
   receive a response associated with the request; and
   perform a security action associated with the private data.

20. The system of claim 15, further comprising computer-executable instructions to:
   determine an output of the first device associated with the error data; and
   provide at least a portion of the output to one or more of the first device or the second device; and
   wherein at least a portion of the user input includes one or more of an indication of or an interaction with the at least a portion of the output.

* * * * *